(12) United States Patent
Baskey et al.

(10) Patent No.: US 8,380,861 B2
(45) Date of Patent: *Feb. 19, 2013

(54) END-TO-END (E2E) SERVICE LEVEL AGREEMENT (SLA) COMPLIANCE ACROSS BOTH MANAGED AND UNMANAGED NETWORK SEGMENTS

(75) Inventors: Michael E. Baskey, Wappingers Falls, NY (US); Mandis S. Beigi, White Plains, NY (US); Sivaram Gottimukkala, Morrisville, NC (US); Lap T. Huynh, Apex, NC (US); Dinakaran Joseph, Apex, NC (US); Einar Lueck, Weil im Schoenbuch (DE); Debanjan Saha, Mohegan Lake, NY (US); Sambit Sahu, Hopewell Junction, NY (US); Dinesh C. Verma, New Castle, NY (US)

(73) Assignee: International Business Machines Corporation, Armonk, NY (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/020,089

(22) Filed: Feb. 3, 2011

(65) Prior Publication Data

US 2011/0125914 A1    May 26, 2011

Related U.S. Application Data

(63) Continuation of application No. 11/847,294, filed on Aug. 29, 2007, now Pat. No. 7,912,968.

(51) Int. Cl.
*G06F 15/16* (2006.01)
(52) U.S. Cl. ........ 709/228; 709/223; 709/224; 709/227; 370/235; 370/438
(58) Field of Classification Search .................. 709/228
See application file for complete search history.

(56) References Cited

U.S. PATENT DOCUMENTS

| 4,403,286 | A   | * | 9/1983  | Fry et al.      | 710/15  |
|-----------|-----|---|---------|-----------------|---------|
| 6,826,613 | B1  | * | 11/2004 | Wang et al.     | 709/227 |
| 2003/0009580 | A1 | * | 1/2003 | Chen et al.    | 709/228 |
| 2004/0100984 | A1 | * | 5/2004 | Nam et al.     | 370/438 |
| 2007/0019552 | A1 | * | 1/2007 | Senarath et al. | 370/235 |

* cited by examiner

*Primary Examiner* — Patrice L Winder
*Assistant Examiner* — Neeraj Utreja
(74) *Attorney, Agent, or Firm* — Steven Greenberg, Esq.; Carey, Rodriguez, Greenberg & O'Keefe

(57) ABSTRACT

Embodiments of the present invention address deficiencies of the art in respect to e2e SLA support in a network of both manageable and unmanageable portions and provide a method, system and computer program product for e2e SLA compliance across both managed and unmanaged network segments. In one embodiment of the invention, a method for e2e SLA compliance across both managed and unmanaged network segments can be provided. The method can include identifying both a managed segment and an unmanaged segment of an e2e network for a communications path implicated by an SLA, determining an observed delay for the unmanaged segment of the e2e network, computing from a desired delay for the communications path and the observed delay a differential delay, and constraining the managed segment to meet the differential delay in order to assure meeting the desired delay for the communications path implicated by the SLA.

9 Claims, 1 Drawing Sheet

END-TO-END (E2E) SERVICE LEVEL AGREEMENT (SLA) COMPLIANCE ACROSS BOTH MANAGED AND UNMANAGED NETWORK SEGMENTS

CROSS-REFERENCE TO RELATED APPLICATIONS

This application is a Continuation of U.S. application Ser. No. 11/847,294, filed on Aug. 29, 2007, now U.S. Pat. No. 7,912,968, which is incorporated herein by reference in its entirety.

BACKGROUND OF THE INVENTION

1. Field of the Invention

The present invention relates to differentiated service in a computer communications network and more particularly to end-to-end (e2e) service level agreement (SLA) compliance.

2. Description of the Related Art

The modern global network can be viewed as a complex interweaving of multiple network technologies, server platforms, client capabilities and application requirements. The vast majority of network technologies handle device requests indiscriminately. That is, regardless of the identity of the requestor or the type of request, each device request can be processed with equal priority. Given the exponential increase in network traffic across the Internet, however, more recent network-oriented computing devices have begun to provide varying levels of computing services based upon what has been referred to as a "policy based service differentiation model".

In a policy based service differentiation model, the computing devices can offer many levels of service where different requests for different content or services which originate from different requestors receive different levels of treatment depending upon administratively defined policies. In this regard, a service level agreement (SLA) can specify a guaranteed level of responsiveness based upon a pre-defined policy. More particularly, the SLA is a contract that specifies an agreement between a service provider and customer regarding a level of service to be provided by the service provider to the customer in respect to a specific resource.

Within the modern enterprise, the enterprise can receive a substantial benefit for effectively providing differentiated service to different customers and different data so that some customers and data receive a higher level of service than other customers and data on the network. That is to say, where the enterprise satisfies the expected service level of a valued customer, the enterprise can retain the customer. Conversely, where the enterprise fails to satisfy the expected level of service of a valued customer, the enterprise likely can lose the customer. Hence, differentiated service can be an important component of e-commerce inasmuch as a customer always can be viewed as merely "one click away" from a competitor's system where response times falter.

Accordingly, the enforcement of the terms of an SLA can be of paramount importance in managing the customer service relationship. To that end, service level management systems have become commonplace in the enterprise. A service level management system can track services provided to customers and compare the delivery of services to the service terms of a corresponding SLA. Performance metrics can be collected over time in respect to the resources associated with the SLA and the metrics can be evaluated to determine if any of the terms of the SLA have been violated.

The application of an SLA to a manageable network involves the tuning of the elements of the manageable network to achieve the performance guaranteed by the SLA. Generally, the performance guaranteed by an SLA relates in some way to an acceptable average delay demonstrated by the manageable network. In an end to end (e2e) network environment, however, the communications path between two endpoints can traverse both manageable portions of a network and unmanageable portions of a network. As such, tuning the components of the e2e network environment necessarily is limited to a best guess approach to providing extremely conservative restraints on the manageable portion of the e2e network and a loosing of terms in a corresponding e2e SLA.

BRIEF SUMMARY OF THE INVENTION

Embodiments of the present invention address deficiencies of the art in respect to e2e SLA support in a network of both manageable and unmanageable portions and provide a novel and non-obvious method, system and computer program product for e2e SLA compliance across both managed and unmanaged network segments. In one embodiment of the invention, a method for e2e SLA compliance across both managed and unmanaged network segments can be provided. The method can include identifying both a managed segment and an unmanaged segment of an e2e network for a communications path implicated by an SLA, determining an observed delay for the unmanaged segment of the e2e network, computing from a desired delay for the communications path and the observed delay a differential delay, and constraining the managed segment to meet the differential delay in order to assure meeting the desired delay for the communications path implicated by the SLA.

In one aspect of the embodiment, computing from a desired delay for the communications path and the observed delay a differential delay can include subtracting the observed delay from the desired delay to produce the differential delay. In another aspect of the embodiment, constraining the managed segment to meet the differential delay in order to assure meeting the desired delay for the communications path implicated by the SLA can include ordering each of different sub-domains in the managed segment according to a minimum delay each of the different sub-domains can achieve, and allocating portions of the differential delay according to the ordering so that a sub-domain able to achieve a least minimum delay is allocated a greatest portion of the differential delay while a sub-domain able to achieve a greatest minimum delay is allocated a least portion of the differential delay.

In another embodiment of the invention, an e2e SLA compliance data processing system can be provided. The system can include a provisioning host coupled to an e2e network comprising both managed and unmanaged segments and SLA compliance logic executing in the host. The logic can include program code enabled to identify at least one of the managed segments and at least one of the unmanaged segments of an e2e network for a communications path implicated by an SLA, to determine an observed delay for the at least one unmanaged segment, to compute from a desired delay for the communications path and the observed delay a differential delay, and to constrain the managed segment to meet the differential delay in order to assure meeting the desired delay for the communications path implicated by the SLA.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for e2e SLA compliance across both managed and unmanaged network segments. In accordance with an embodiment of the present invention, a requisite path of communications in an e2e network environment can be determined for a participant to an SLA and one or more managed and unmanaged segments of the e2e network environment traversed by the path of communications can be identified. An observed delay budget for the identified unmanaged segments can be established and a composite delay budget for the e2e network environment can be established according to the SLA. Finally, a differential delay budget accounting for the composite delay budget and the observed delay budget can be computed for the managed segments. Thereafter, the individual sub-domains in the managed segments can be constrained to accommodate the differential delay budget to meet the composite delay budget under the SLA for the e2e network environment.

Figure 1:
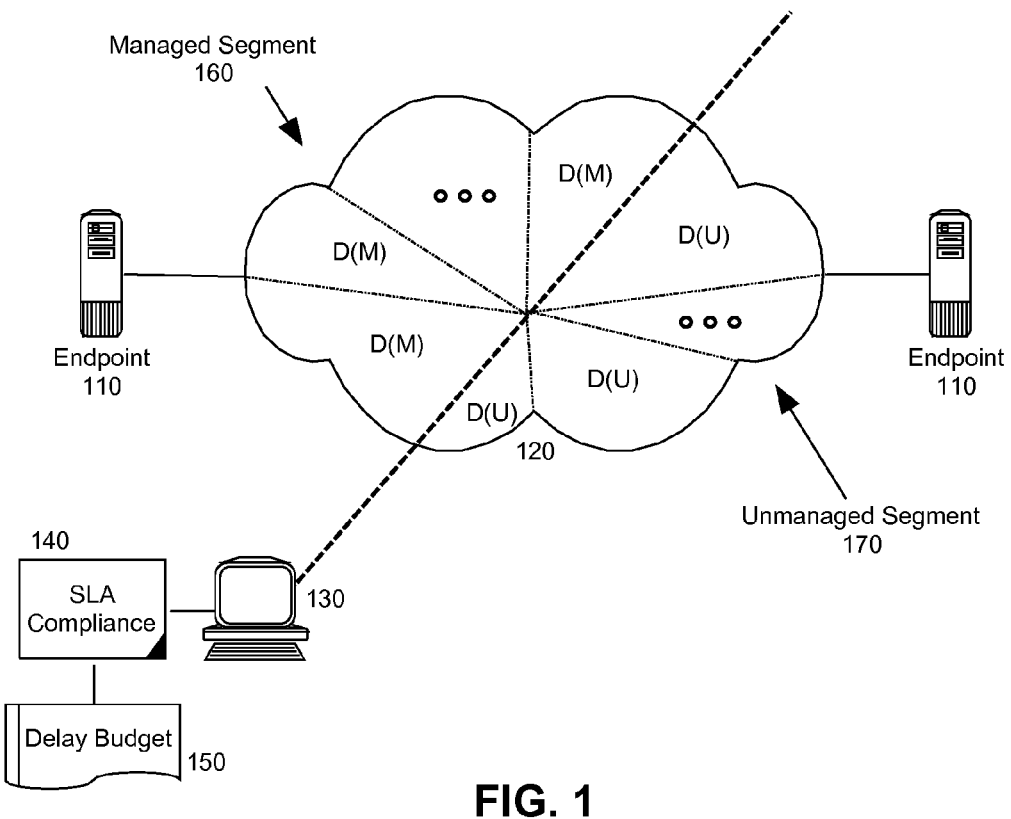
FIG. 1 is a schematic illustration of an e2e network environment configured for e2e SLA compliance across both managed and unmanaged network segments; and, FIG. 2 is a flow chart illustrating a process for e2e SLA compliance across both managed and unmanaged network segments of an e2e network environment.

In further illustration, FIG. 1 is a schematic illustration of an e2e network environment configured for e2e SLA compliance across both managed and unmanaged network segments. As shown in FIG. 1, an e2e network environment can include two endpoints 110 communicatively coupled to one another over a computer communications network 120. The computer communications network 120 can include one or more managed segments 160 and one or more unmanaged segments 170. Each of the managed segments 160 can include one or more managed sub-domains D(M). Likewise, each of the unmanaged segments 170 can include one or more unmanaged sub-domains D(U).

A provisioning host 130 can be coupled to the computer communications network 120. The provisioning host 130 can be configured to manage the provisioning of the managed sub-domains D(M) in the managed segments 160. The provisioning host 130 further can be configured to observe each of the managed segments 160 and the unmanaged segments 170 in order to record observed delays in transactions between the endpoints 110. Finally, the provisioning host 130 can be coupled to SLA compliance logic 140.

The SLA compliance logic 140 can include program code enabled to strategically provision the managed sub-domains D(M) in order to meet a delay budget 150 provided by an SLA for the endpoints 110. In this regard, the delay budget 150 can be reduced by an observed delay for the unmanaged segment 170 in order to compute a differential delay budget. Once computed, the differential delay budget can be applied to the managed segment 160 in order to appropriately provision the managed sub-domains D(M). In this way, the delay budget 150 for the SLA can be met despite an inability to manage the managed sub-domains D(U) of the unmanaged segment 170 of the computer communications network.

Figure 2:
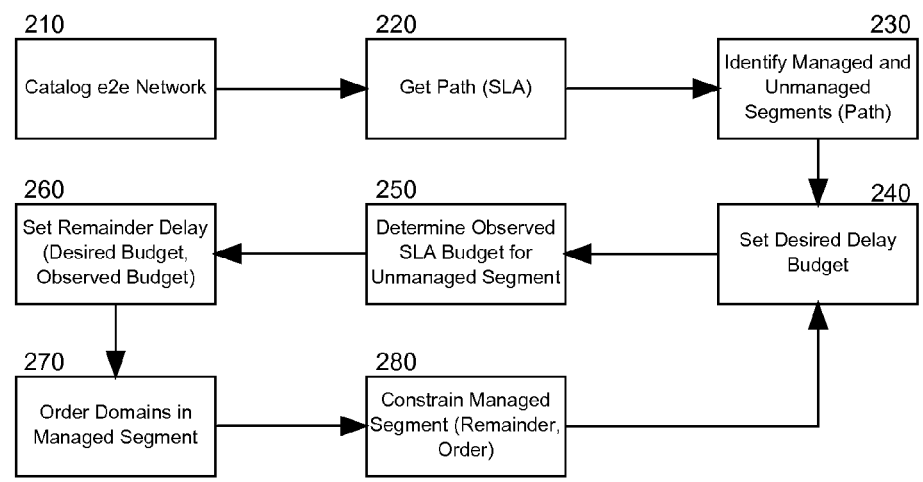

In yet further illustration, FIG. 2 is a flow chart illustrating a process for e2e SLA compliance across both managed and unmanaged network segments of an e2e network environment. Beginning in block 210, the sub-domains of both managed and unmanaged segments of an e2e network can be catalogued. Thereafter, in block 220 the communications path across the e2e network implicated by an SLA can be determined and in block 230, particular ones of both the sub-domains on the managed segment and also the sub-domains on the unmanaged segment of the e2e network for the communications path can be identified.

In block 240, a desired delay budget 240 for the SLA can be established. Alternatively, a loss metric or other such metric for the SLA can be established. Also, in block 250 an observed required delay budget for the sub-domains of the unmanaged segment of the e2e network implicated by the communications path can be determined. In the alternative, a required loss metric budget for the sub-domains of the unmanaged segment of the e2e network implicated by the communications path can be determined. Consequently, a differential budget can be computed in block 260 as the difference between the established delay budget and the observed required delay budget, or the different in the established loss metric and the required loss metric. The differential can be used, then, for provisioning the sub-domains of the managed segment of the e2e network implicated by the communications path.

In block 270, the sub-domains in the managed segment of the e2e network implicated by the communications path can be ordered from most constrained to least constrained. Specifically, the sub-domains can be ordered in terms of the minimum delay (or minimum loss metric or other such metric) that each sub-domain can satisfy in order to meet the policy requirements for resource provisioning. Thereafter, in block 280, the sub-domains of the managed segment of the e2e network implicated by the communications path can be constrained according to a portion of the differential delay budget allocated to each of the sub-domains. For example, using a "Greedy" algorithm, the differential budget can be partitioned so that the most constrained sub-domain is allocated the greatest portion of the differential delay budget and so forth.

Finally, the process can repeat through block 240 in the event of a significant change in network performance for the SLA, or a significant change in network load along other communications paths implicated by the SLA. Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for end to end (e2e) service level agreement (SLA) compliance across both managed and unmanaged network segments, the method comprising:
   identifying both a managed segment and an unmanaged segment of an e2e network for a communications path implicated by an SLA;
   determining an observed delay for the unmanaged segment of the e2e network;
   computing from a desired delay for the communications path and the observed delay a differential delay; and,
   adjusting minimum delays of sub-domains of the managed segment to meet the differential delay in order to assure meeting the desired delay for the communications path implicated by the SLA.

2. The method of claim 1, wherein computing from a desired delay for the communications path and the observed delay a differential delay, comprises subtracting the observed delay from the desired delay to produce the differential delay.

3. The method of claim 1, further comprising:
   detecting a material change in network performance in the e2e network; and,
   repeating the identifying, determining, computing and adjusting in response to detecting the material change.

4. The method of claim 1, further comprising:
   detecting a material change in network load in the e2e network; and,
   repeating the identifying, determining, computing and adjusting in response to detecting the material change.

5. An end to end (e2e) service level agreement (SLA) compliance data processing system comprising:
   a provisioning host coupled to an e2e network comprising both managed and unmanaged segments;
   SLA compliance logic executing in the host, the logic comprising program code enabled to identify at least one of the managed segments and at least one of the unmanaged segments of an e2e network for a communications path implicated by an SLA, to determine an observed delay for the at least one unmanaged segment, to compute from a desired delay for the communications path and the observed delay a differential delay, and to adjust minimum delays of subdomains of the managed segment to meet the differential delay in order to assure meeting the desired delay for the communications path implicated by the SLA.

6. A computer program product comprising a computer usable storage medium storing computer usable program code for end to end (e2e) service level agreement (SLA) compliance across both managed and unmanaged network segments, the computer program product comprising:
   computer usable program code for identifying both a managed segment and an unmanaged segment of an e2e network for a communications path implicated by an SLA;
   computer usable program code for determining an observed delay for the unmanaged segment of the e2e network;
   computer usable program code for computing from a desired delay for the communications path and the observed delay a differential delay; and,
   computer usable program code for adjusting minimum delays of sub-domains of the managed segment to meet the differential delay in order to assure meeting the desired delay for the communications path implicated by the SLA.

7. The computer program product of claim 6, wherein the computer usable program code for computing from a desired delay for the communications path and the observed delay a differential delay, comprises computer usable program code for subtracting the observed delay from the desired delay to produce the differential delay.

8. The computer program product of claim 6, further comprising:
   computer usable program code for detecting a material change in network performance in the e2e network; and,
   computer usable program code for repeating the identifying, determining, computing and adjusting in response to detecting the material change.

9. The computer program product of claim 8, further comprising:
   computer usable program code for detecting a material change in network load in the e2e network; and,
   computer usable program code for repeating the identifying, determining, computing and adjusting in response to detecting the material change.

* * * * *